US011909739B2

(12) United States Patent
Henry et al.

(10) Patent No.: US 11,909,739 B2
(45) Date of Patent: Feb. 20, 2024

(54) INDUSTRIAL SECURITY MODEL AS A SASE SERVICE

(71) Applicant: Cisco Technology, Inc., San Jose, CA (US)

(72) Inventors: Jerome Henry, Pittsboro, NC (US); Robert Edgar Barton, Richmond (CA); Elango Ganesan, Portola Valley, CA (US); Flemming Stig Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 17/395,766

(22) Filed: Aug. 6, 2021

(65) Prior Publication Data

US 2023/0040607 A1 Feb. 9, 2023

(51) Int. Cl.
*H04L 29/06* (2006.01)
*H04L 9/40* (2022.01)

(52) U.S. Cl.
CPC ........ *H04L 63/102* (2013.01); *H04L 63/0236* (2013.01); *H04L 63/0272* (2013.01); *H04L 63/1425* (2013.01); *H04L 63/20* (2013.01)

(58) Field of Classification Search
CPC .............. H04L 63/102; H04L 63/0236; H04L 63/0272; H04L 63/1425; H04L 63/20
See application file for complete search history.

(56) References Cited

U.S. PATENT DOCUMENTS

| 6,546,423 | B1 * | 4/2003 | Dutta | .................. H04L 67/1008 |
| | | | | 713/153 |
| 7,891,001 | B1 | 2/2011 | Greenawalt | |
| 10,231,120 | B2 * | 3/2019 | Nethi | ..................... H04W 12/03 |
| 10,609,081 | B1 * | 3/2020 | Appala | ............... H04L 61/5007 |
| 11,240,203 | B1 * | 2/2022 | Eyada | ................. H04L 63/0263 |

(Continued)

FOREIGN PATENT DOCUMENTS

WO WO-2005046178 A2 * 5/2005 ........... H04L 63/083

OTHER PUBLICATIONS

"Cisco TruseSec Switch Configuration Guide," Cisco, Dec. 3, 2018.

(Continued)

*Primary Examiner* — Shin-Hon (Eric) Chen
(74) *Attorney, Agent, or Firm* — Polsinelli P.C.

(57) ABSTRACT

A method includes determining a corresponding level of a security model associated with each device of a plurality of devices connected to a network, each level of the security model having a corresponding tag; applying, to each of the plurality of devices, the corresponding tag based on the corresponding level of the security model with which each of the plurality of devices are associated; receiving, over a network connection, network traffic from at least one of the plurality of devices and the corresponding tag; analyzing the corresponding tag associated with the network traffic; determining a destination for the network traffic; applying one or more security measures to the network traffic based on the corresponding tag for the at least one device and a corresponding tag of the destination for the network traffic; and sending the network traffic to the destination with the corresponding tag of the destination.

20 Claims, 7 Drawing Sheets

(56) References Cited

U.S. PATENT DOCUMENTS

| | | | |
|---|---|---|---|
| 11,375,005 B1* | 6/2022 | Rolando | H04L 12/4633 |
| 2004/0080772 A1* | 4/2004 | Snyders | G06F 21/608 |
| | | | 358/1.14 |
| 2005/0097357 A1 | 5/2005 | Smith | |
| 2005/0190758 A1* | 9/2005 | Gai | H04L 12/4645 |
| | | | 370/389 |
| 2006/0174112 A1* | 8/2006 | Wray | H04L 63/0428 |
| | | | 713/168 |
| 2008/0127297 A1* | 5/2008 | Morris | H04L 63/10 |
| | | | 726/1 |
| 2017/0118173 A1 | 4/2017 | Arramreddy | |
| 2019/0140849 A1 | 5/2019 | Kravitz et al. | |
| 2020/0177638 A1* | 6/2020 | Salman | H04L 41/12 |
| 2020/0358878 A1* | 11/2020 | Bansal | H04L 63/0236 |
| 2021/0194932 A1 | 6/2021 | Hill | |
| 2021/0234901 A1* | 7/2021 | Thomas | H04L 63/0263 |
| 2021/0409486 A1* | 12/2021 | Martinez | H04L 67/1001 |
| 2022/0021653 A1* | 1/2022 | Metz | H04L 63/168 |

OTHER PUBLICATIONS

International Search Report and Written Opinion for PCT application No. PCT/US2022/074546, dated Nov. 24, 2022, 10 pages.
Manson, et al., "Practical Cybersecurity for Protection and Control System Communications Networks", IEEE 2017, Sep. 18, 2017, 10 pages.
Zografopoulos, et al., "Cyber-Physical Energy Systems Security: Threat Modeling, Risk Assessment, Resources, Metrics, and Case Studies", IEEE Access, vol. 9, Feb. 10, 2021, 44 pages.

* cited by examiner

INDUSTRIAL SECURITY MODEL AS A SASE SERVICE

TECHNICAL FIELD

The subject matter of this disclosure relates in general to the field of computer networking, and more particularly, to Software-as-a-Service model offering virtualized security functionalities offered to a network of connected devices.

BACKGROUND

Wireless communications systems and computer networks are deployed to provide various telecommunications and data services. As networks grow, reliability and security of such networks become important and critical to the underlying purposes for which these networks are utilized.

The Purdue model for control hierarchy is a security architecture for Industrial networks and Operational Telecom (OT). This model has been standardized and is used within industries such as manufacturing, mining, oil and gas, transportation, and smart cities, etc. Core to this model is the concept of security levels. Few users fully deploy this model because of the cost and complexity involved (for example, a small remote manufacturing plant, or a regional water treatment plant, etc.).

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are systems, methods, and computer-readable media for providing virtualized security functionalities to a network of connected devices that eliminates the need of independent and full deployment of security architectures such as the Purdue model by each operator of such networks of connected devices. These virtualized security functionalities are cloud-based Software-as-a-Service (SaaS).

In one aspect, a method includes determining, by a network controller, a corresponding level of a security model associated with each device of a plurality of devices connected to a network, each level of the security model having a corresponding tag; applying, by the network controller and to each of the plurality of devices, the corresponding tag based on the corresponding level of the security model with which each of the plurality of devices are associated; receiving, at the network controller and over a network connection, network traffic from at least one of the plurality of devices and the corresponding tag; analyzing the corresponding tag associated with the network traffic; determining a destination for the network traffic; applying one or more security measures to the network traffic based on the corresponding tag for the at least one device and a corresponding tag of the destination for the network traffic; and sending the network traffic to the destination with the corresponding tag of the destination after the one or more security measures are applied to the network traffic.

In some aspects, applying the one or more security measures to the network traffic includes comparing the corresponding tag of the at least one device with the corresponding tag of the destination; and passing the network traffic through a firewall for a level of the security model associated with the corresponding tag of the destination.

In some aspects, the network connection is a private virtual network connection.

In some aspects, the security model is a virtualized Purdue model.

In some aspects, the virtualized Purdue model is offered as a cloud-based service to an entity operating the plurality of devices.

In some aspects, the plurality of devices include Internet of Things.

In some aspects, the corresponding tag associated with the corresponding level of the security model is applied to the at least one device at an edge device to which the at least one device is connected.

In one aspect, a network controller includes one or more memories having computer-readable instructions stored therein and one or more processors. The one or more processors are configured to execute the computer-readable instructions to determine a corresponding level of a security model associated with each device of a plurality of devices connected to a network, each level of the security model having a corresponding tag; apply, to each of the plurality of devices, the corresponding tag based on the corresponding level of the security model with which each of the plurality of devices are associated; receive, over a network connection, network traffic from at least one of the plurality of devices and the corresponding tag; analyze the corresponding tag associated with the network traffic; determine a destination for the network traffic; apply one or more security measures to the network traffic based on the corresponding tag for the at least one device and a corresponding tag of the destination for the network traffic; and send the network traffic to the destination with the corresponding tag of the destination after the one or more security measures are applied to the network traffic.

In one aspect, one or more non-transitory computer-readable media include computer-readable instructions, which when executed by a network controller, cause the network controller to determine a corresponding level of a security model associated with each device of a plurality of devices connected to a network, each level of the security model having a corresponding tag; apply, to each of the plurality of devices, the corresponding tag based on the corresponding level of the security model with which each of the plurality of devices are associated; receive, over a network connection, network traffic from at least one of the plurality of devices and the corresponding tag; analyze the corresponding tag associated with the network traffic; determine a destination for the network traffic; apply one or more security measures to the network traffic based on the corresponding tag for the at least one device and a corresponding tag of the destination for the network traffic; and send the network traffic to the destination with the corresponding tag of the destination after the one or more security measures are applied to the network traffic.

EXAMPLE EMBODIMENTS

As noted above, existing network security architectures such as the Purdue model for control hierarchy is used for Industrial networks and Operational Telecom (OT). This model has been standardized and is used within industries such as manufacturing, mining, oil and gas, transportation, and smart cities, etc. Core to this model is the concept of security levels.

Core to such security models such as the Purdue model is the concept of security levels. The lower the level, the deeper security needs to be. According to the model, a security control gateway needs to be implemented between each level (called a "controlled conduit"). This may include reverse proxies to communicate with Human-Machine Interfaces (HMIs), Supervisory Control and Data Acquisition (SCADA) firewalls between the SCADA server (Level 3) and the Programmable Logic Controllers (PLCs) (Level 2), and a host of security controls for external cloud data management used by machine builders.

In reality, very few customers (e.g., operators of industrial network of connected devices) fully deploy this model because of the cost and complexity involved—especially customers such a small remote manufacturing plant, a regional water treatment plant, etc.

Secure Access Edge Service (SASE) is a framework that consolidates numerous networking and security functions traditionally delivered in siloed point solutions at the network edge. This SASE framework is fundamentally changing security architectures and how security services are delivered. For example, SASE allows customers (e.g., organizations using an enterprise network) to select non-traditional security vendors (a SASE service provider) for ensuring the security of their network. With the capabilities enabled through SASE, the present disclosure provides examples of enabling the security architectures such as the Purdue model to be offered as a suite of cloud-based SASE services. This suite of services may be referred to as virtual industrial security services.

The present disclosure begins with a description of a number of example network architectures and environments in which the concepts described herein may be applied.

An end device or an end terminal can include devices such as a mobile phone, router, tablet computer, laptop computer, tracking device, wearable device (e.g., a smart watch, glasses, an XR device, etc.), Internet of Things (IoT) device, a vehicle (or a computing device of a vehicle), and/or another device used by a user to communicate over a wireless communications network. In some instances, a computing device can be referred to as user equipment (UE), such as when referring to a wireless device configured to communicate using 5G/New Radio (NR) or other telecommunications standard. In some examples, a computing device can be referred to as an endpoint.

Figure 1:
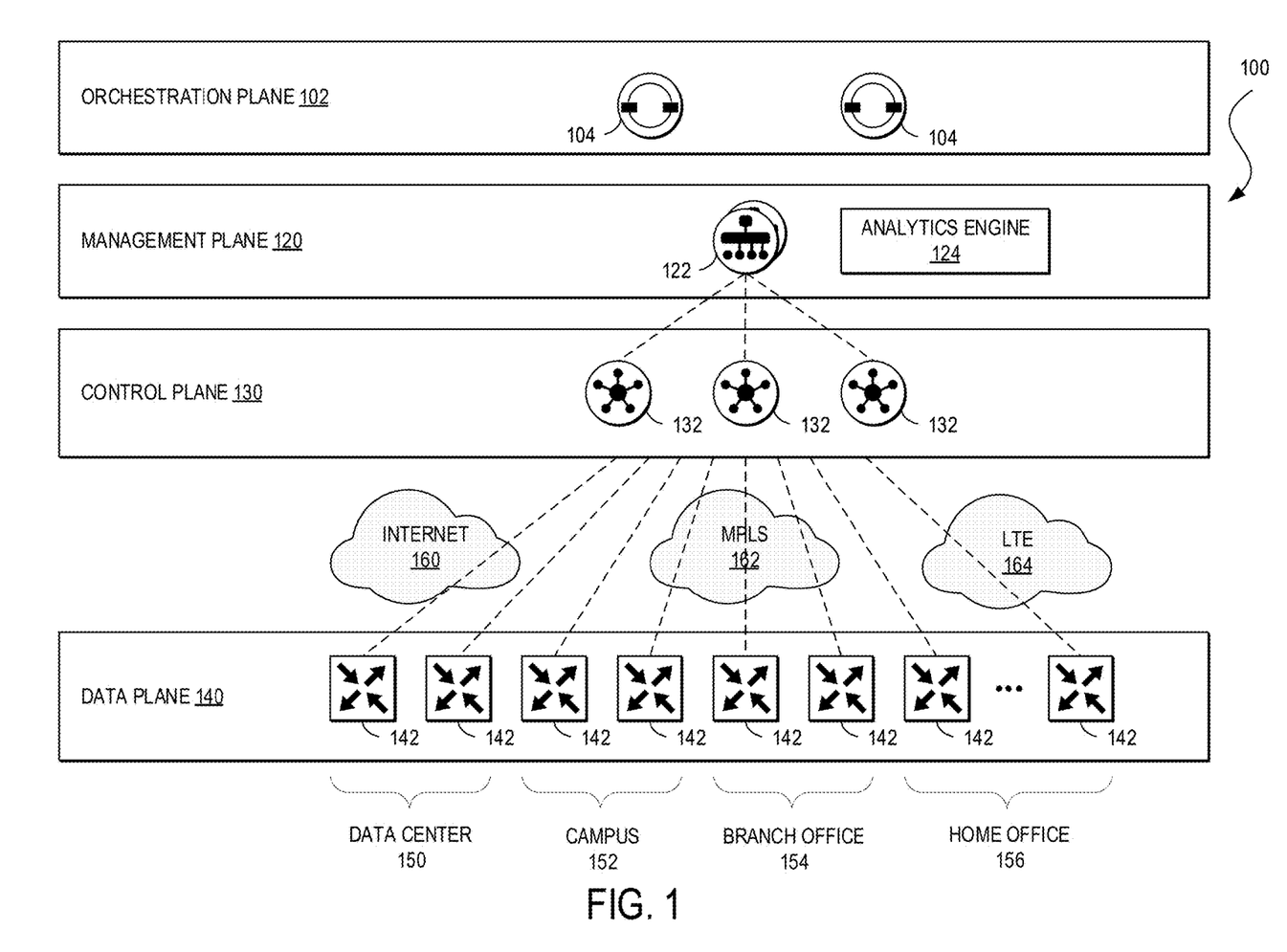
FIG. 1 illustrates an example of a network architecture, according to some aspects of the present disclosure.

FIG. 1 illustrates an example of a network architecture, according to some aspects of the present disclosure. An example of an implementation of the network architecture 100 is the Cisco® SDWAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122 and an analytics engine 124. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.) using, in part, network and data intelligence gathered by the analytics engine 124. Alternatively, or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each edge network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
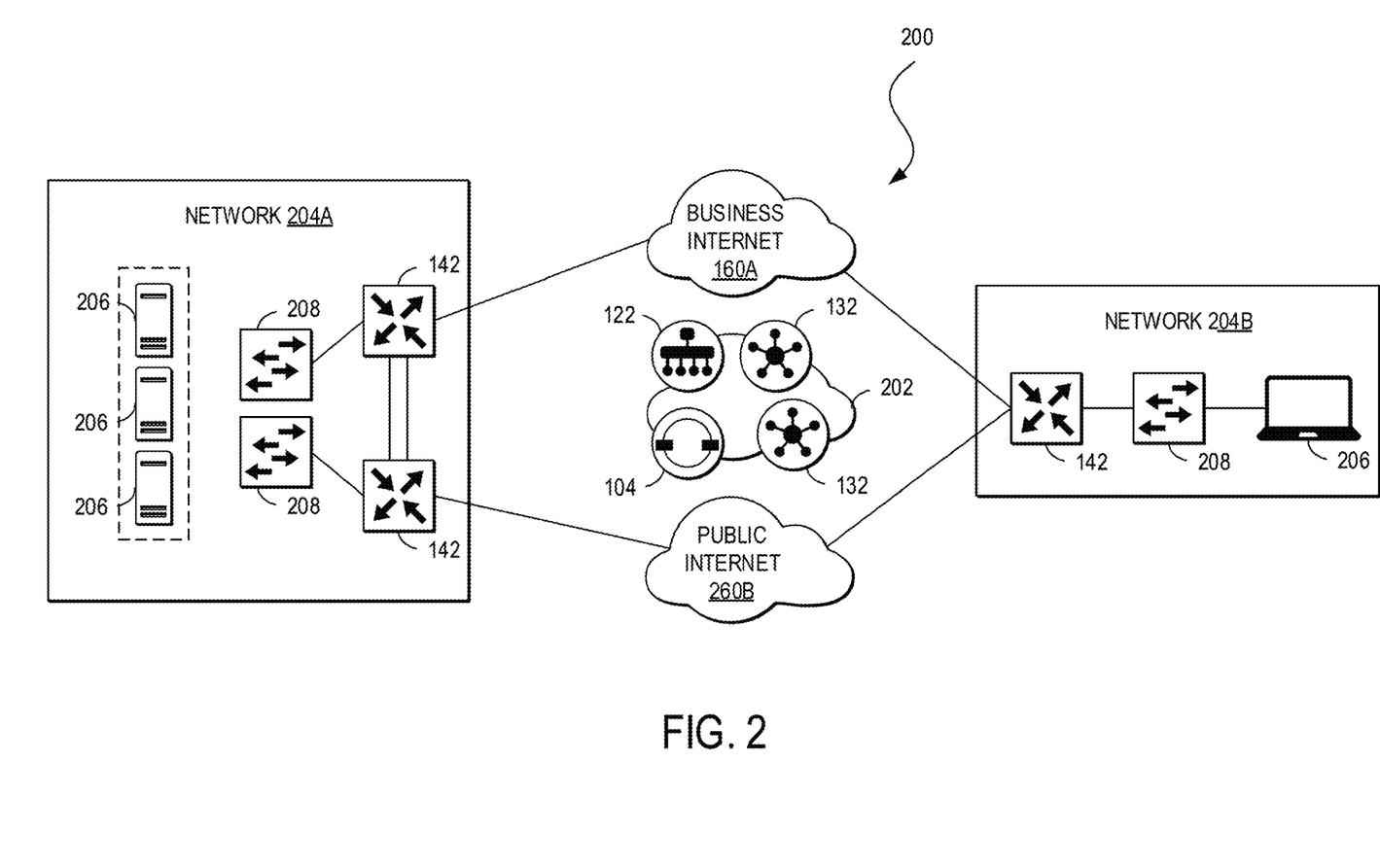
FIG. 2 illustrates an example of a network topology, according to some aspects of the present disclosure.

FIG. 2 illustrates an example of a network topology, according to some aspects of the present disclosure. Network topology 200 shows various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints (end terminals or end devices) 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HNDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Various types of protocols and communication schemes may be applied for enabling communication of control messages between components of the network architecture 100 (e.g., an Overlay Management Protocol (OMP), which may be used to transmit OMP messages back and forth between the network controller appliance 132 and the edge network devices 142, respectively, where control plane information, such as route prefixes, next-hop routes, crypto keys, policy information, and so forth, can be exchanged over respective secure DTLS or TLS connections. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

Furthermore, end terminals may connect to network architecture via any known or to be developed communication scheme such as Virtual Private Network (VPN) connection, etc.

With various non-limiting examples of architecture(s) and operation of SD-WANs described with reference to FIGS. 1 and 2, next a cloud-based security service that can be applied as a security layer to manage security of a network architecture (e.g., a SD-WAN) such as the network architecture 100 and communications to and from remotely connected end terminals will be described with reference to FIGS. 3 and 4.

Figure 3:
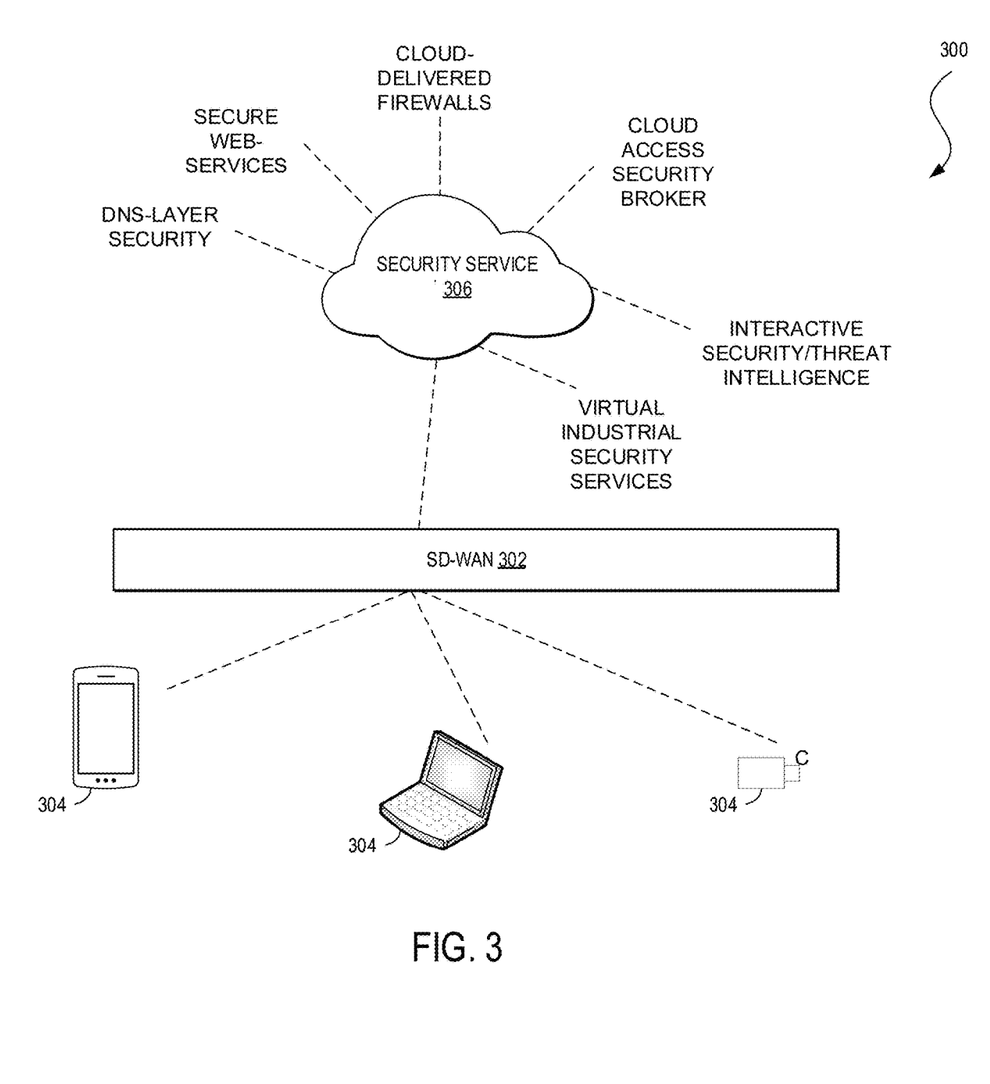
FIG. 3 illustrates an example network architecture with a cloud-based security layer, according to some aspects of the present disclosure.

FIG. 3 illustrates an example network architecture with a cloud-based security layer, according to some aspects of the present disclosure. Environment 300 includes SD-WAN 302, which can be the same as the non-limiting examples described above with reference to FIGS. 1 and 2. Hence, SD-WAN 302 will not be described further. End terminals 304 may be connected to SD-WAN 302 via various known or to be developed wired and/or wireless communication schemes (e.g., VPN, ethernet, etc.). End terminals 304 may be the same as those described above with reference to FIGS. 1 and 2 including, but not limited to, mobile devices, laptops, cameras, robots, any other known or to be developed IoT devices, etc.

Environment 300 also includes cloud-based security service 306 that can provide several security related functionalities and services to end terminals 304 connected to SD-WAN 302. As shown, such services include, but are not limited to, Domain Name System (DNS)-layer security, secure web-services, cloud-delivered firewalls, cloud access security broker, interactive threat/security intelligence, virtual industrial security services (e.g., a virtualized Purdue model). A non-limiting example of cloud-based network security service 306 is the Cisco Umbrella, described above.

Figure 4:
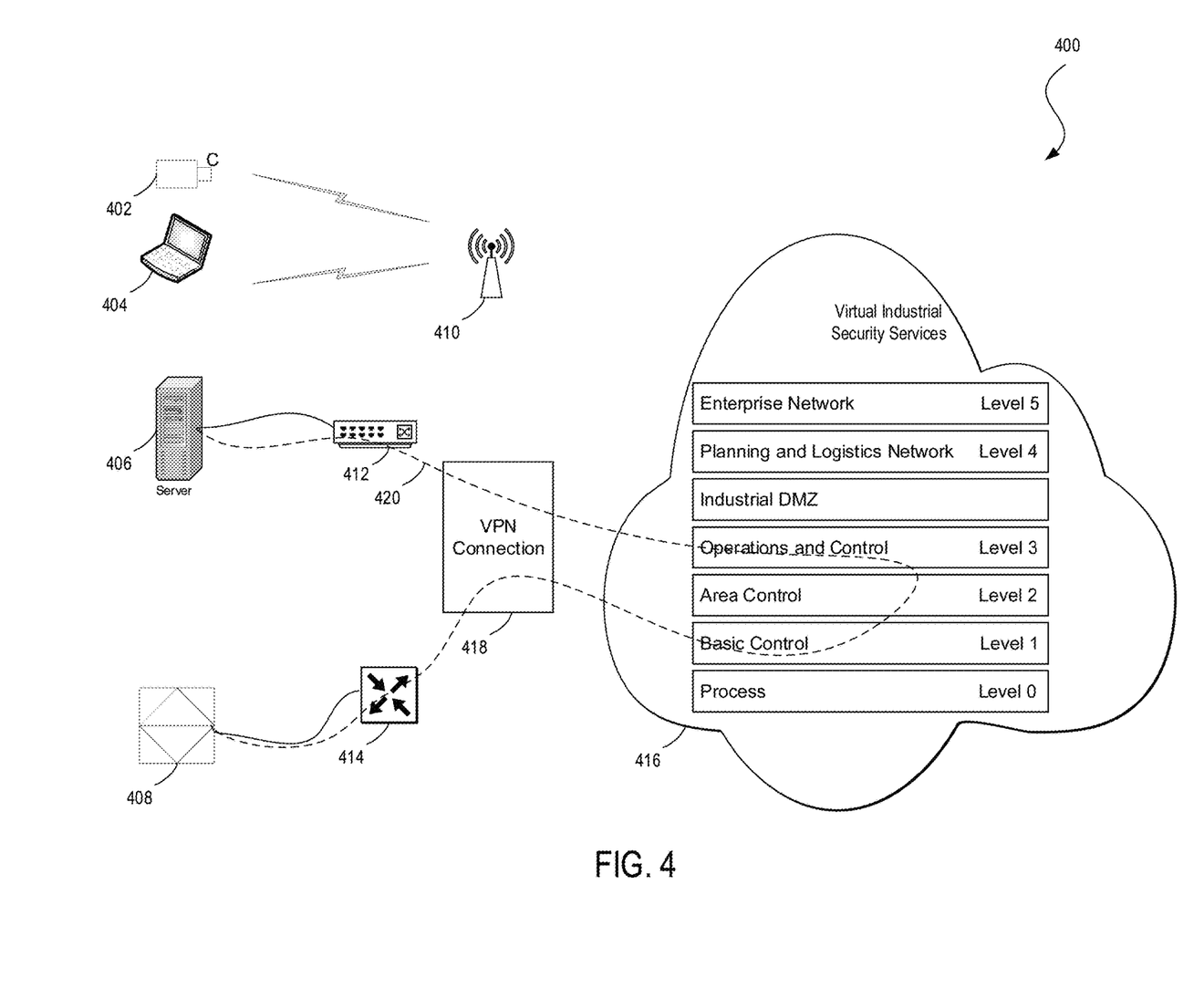
FIG. 4 illustrates an example network environment including virtual industrial security services offered as part of the security service of FIG. 3, according to some aspects of the present disclosure.

FIG. 4 illustrates an example network environment including virtual industrial security services offered as part of the security service of FIG. 3, according to some aspects of the present disclosure. As shown in FIG. 4, environment 400 includes a number of network connected devices (may also be referred to as industrial IoT devices). Examples of such devices include, but are not limited to, camera 402, laptop (workstation) 404, a server 406 (e.g., a SCADA server), a PLC 408, etc. Network devices may be the same as end terminal 304 of FIG. 3. These devices may be referred to as industrial asserts. These devices may be connected at the industrial level (through known or to be developed wired and/or wireless connections) to switches, wireless access points, gateway routers, etc. As a non-limiting example, the camera 402 and the workstation 404 may be wirelessly connected to wireless access point 410. The SCADA server 406 may be physically connected (through a wired connection) to switch 412. The PLC 408 may be physically connected (through a wired connection) to a gateway router such as router 414. The type of connection of the devices to such access points, routers, switches, etc. may be wired or wireless. The wireless access point 410, the switch 412, and the router 414 may be referred to as network edge devices.

Environment 400 also includes security service 416, which may be the same as security service 306 of FIG. 3 (e.g., a non-limiting example of which is Cisco Umbrella). However, for purposes of describing FIG. 4, only the example of virtual industrial security services offered by the security service 416 is shown and will be described in detail below.

As noted above, the virtual industrial security service may be a virtual implementation of the Purdue security model having multiple levels such as process (level 0), basic control (level 1), area control (level 2), operations and control (level 3), industrial DMZ, planning and logistics network (level 4), enterprise network (level 5). Each network connected device may be associated with one of the level of the Purdue model and each level may have its own security requirement that devices from other levels may have to go through in order to communicate and exchange network traffic with connected devices in that level. For example, the PLC 408 may be associated with level 1 while the SCADA server 406 may be associated with level 3 of the Purdue model. Accordingly, for the PLC 408 to communicate with the SCADA server 406, the underlying traffic may have to pass through appropriate firewall services at level 3 before being sent to the SCADA server 406. As will be described below, this virtual and hence scalable Purdue security architecture can be provided to the underlying industrial asserts by applying appropriate level tags to the industrial asserts and communicating the same to the security service 416 using connections such as Virtual Private Network (VPN) connection 418. The example traffic route between the SCADA server 406 and the PLC 408 is shown using dotted line 420.

The network connected devices 402, 404, 406, and/or 408 may be in the same physical location (e.g., on a factory floor) or may be at different locations (e.g., different offices or branches of the same organization). The number of network connected devices is not limited to devices 402, 404, 406, and/or 408 but may be more or less. In some practical applications, the number of such devices may be in the tens, hundreds, or thousands.

The virtualized industrial security architecture offered by the security server 306 allows network operators of industrial asserts to eliminate the need and cost of implementing all or parts of the Purdue model. For example, a company may have some elements of the Purdue model (such as an industrial firewall at the iDMZ (Level 3.5), however, many other aspects may be missing due to the complexity and cost involved in building such a network.

Figure 5:
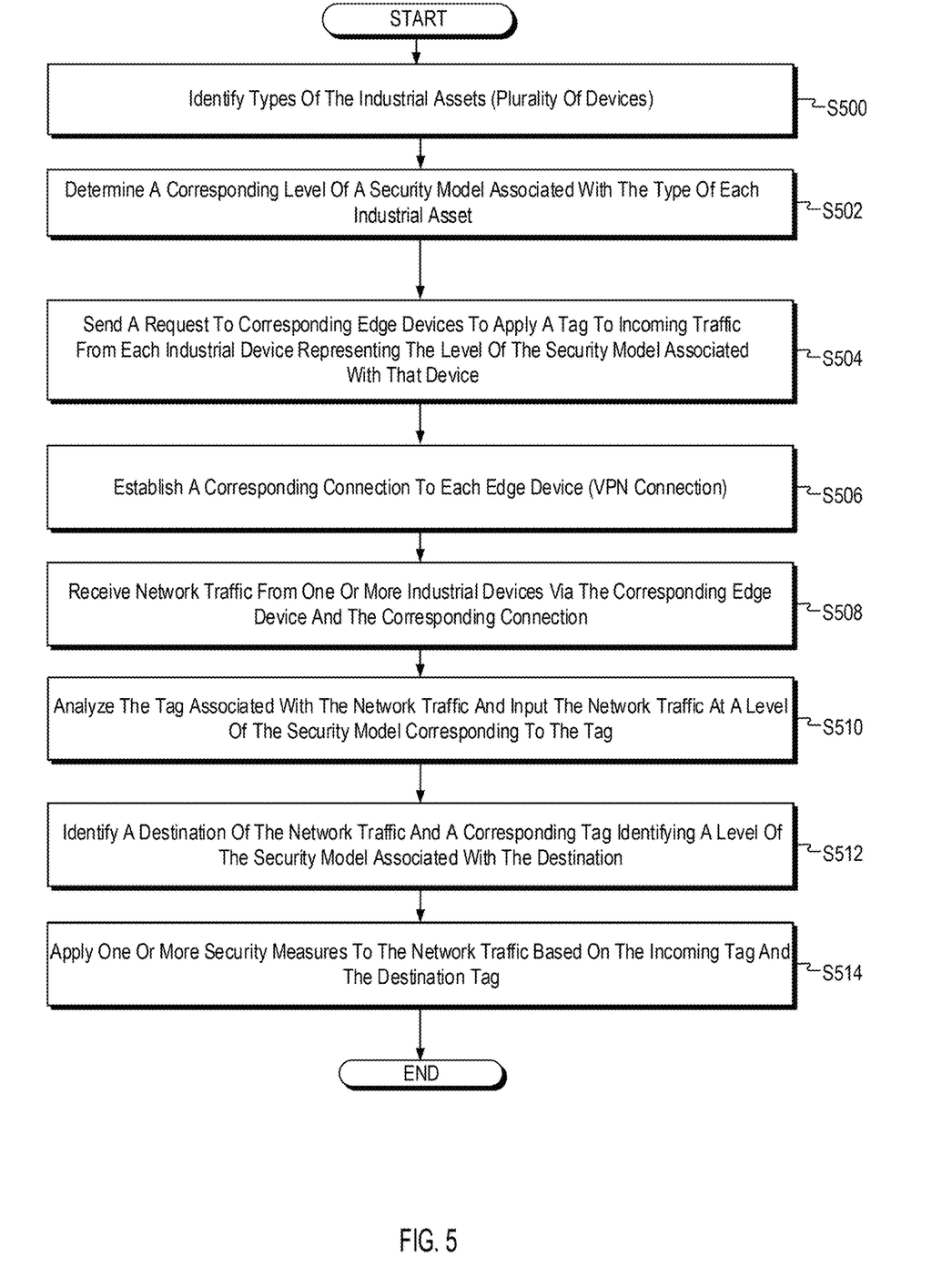
FIG. 5 describes an example process of using virtualized industrial security services within the environment of FIG. 4, according to some aspects of the present disclosure.

FIG. 5 describes an example process of using virtualized industrial security services within the environment of FIG. 4, according to some aspects of the present disclosure.

FIG. 5 will be described from the perspective of security service 416. However, it should be understood that security service 416 may be implemented as a network controller (may also be referred to as a cloud network controller) where computer-readable instructions stored on one or more associated memories may be executed by one or more associated processors to implement the functionalities of FIG. 5. In describing steps of FIG. 5, references may be made to any one of FIGS. 1-4 and components thereof described above.

At S500, the security service 416 identifies types of the underlying industrial assets (e.g., devices 402, 404, 406, and 408 of FIG. 4) connected to a network utilizing the services of the security service 416 including the virtual industrial security service described above. In one example, the security service 416 identifies the types using functionalities such as Cybervision running on routers, switches, access points such as the access point 410, the switch 412, and/or the gateway 414 of FIG. 4. The identified types of the industrial asserts may be catalogued and stored at the security service 416. The industrial devices may be referred to as a plurality of devices.

At S502, the security service 416 determines a corresponding level of the security model (e.g., level of the Purdue model) associated with each device based on the identified type of that device. For example, all PLCs (e.g., PLC 408) resides at level 1. Engineering Workstations (e.g., workstation 404) resides at level 2, a Historian Data Collector (e.g. OSI Pi) resides at level 3, and so on. The security service 416 thus creates a complete list of industrial devices and their corresponding level within the security model.

At S504, the security service 416 sends to each edge device a request to apply a tag to incoming traffic from each industrial device connected to that edge device. The tag corresponds to (represents) the level of the security model with which that device is associated according to the list of industrial devices created at S502. In the non-limiting example of FIG. 4, edge devices may be any one of the wireless access point 410, switch 412, and router 414.

As an example, the security service 416 may determine that the PLC 408 is associated with level 1 of the security model. Accordingly, the security service 416 sends a message to router 414 to which the PLC 408 is connected, requesting that the router 414 apply a tag for level 1 to incoming traffic from the PLC 408. In another example, the security service 416 may determine that the SCADA server 406 is associated with level 3 of the security model. Accordingly, the security service 416 sends a message to the switch 412 to which the SCADA server 406 is connected, requesting that the switch 412 apply a tag for level 3 to incoming traffic from the SCADA server 406.

At S506, the security service 416 establishes a corresponding connection to each of the edge devices 410, 412, and/or 414, upon receiving a connection request from the corresponding one of the edge devices. Such request may be for a VPN connection.

At S508, the security service 416 may receive corresponding network traffic from one or more of the industrial devices, via the corresponding one of the edge devices 410, 412, and/or 414 over the corresponding connection (e.g., a VPN connection 418 of FIG. 4) established at S506 between the security service 416 and the corresponding edge device of the edge devices 410, 412, and/or 414.

At S510, the security service 416 analyzes the tag of the received network traffic (e.g., the tag indication level 1 associated with the traffic received from the PLC 408) and inputs the network traffic at the level of the security model corresponding to the tag (e.g., at level 1 for the network traffic from the PLC 408). The tag identified at S510 may be referred to as an incoming tag of the network traffic.

At S512, the security service 416 identifies (determines) a destination for the network traffic and a corresponding level of the security model associated with the identified destination. For example, the network traffic coming from the PCL 408 may be intended to reach a destination at a higher level of the security model (e.g., the destination may be the SCADA server 406 at the level 3 of the security model). The tag identified at S512 may be referred to as a destination tag of the network traffic.

At S514, the security service 416 applies one or more security measures to the network traffic based on the corresponding tag of the network device from which the traffic is received (identified at S510) and the corresponding tag of the destination for the network traffic (identified at S512). In other words, the security service 416 may compare the incoming tag with the destination tag for the network traffic to determine the appropriate security measure to be applied to the network traffic before being sent out of the correct level of the security model to the intended destination (example route 420 shown in FIG. 4).

For example, all network traffic entering the security model at level 1 may have to pass through a firewall to reach level 3 of the model. Accordingly, the security service 416 passes the network traffic through a firewall for level 3, before sending the network traffic to its destination (e.g., the SCADA server 406). In one example, the network traffic is assigned a new tag (e.g., for level 3) before being sent out by the security service 416 to its destination (e.g., the SCADA server 406).

Accordingly, a virtualized security model is provided to a network of connected devices that eliminates the need of independent and full deployment of security architectures such as the Purdue model by each operator of networks of connected devices. These virtualized security functionalities are cloud-based Software-as-a-Service (SaaS).

Figure 6:
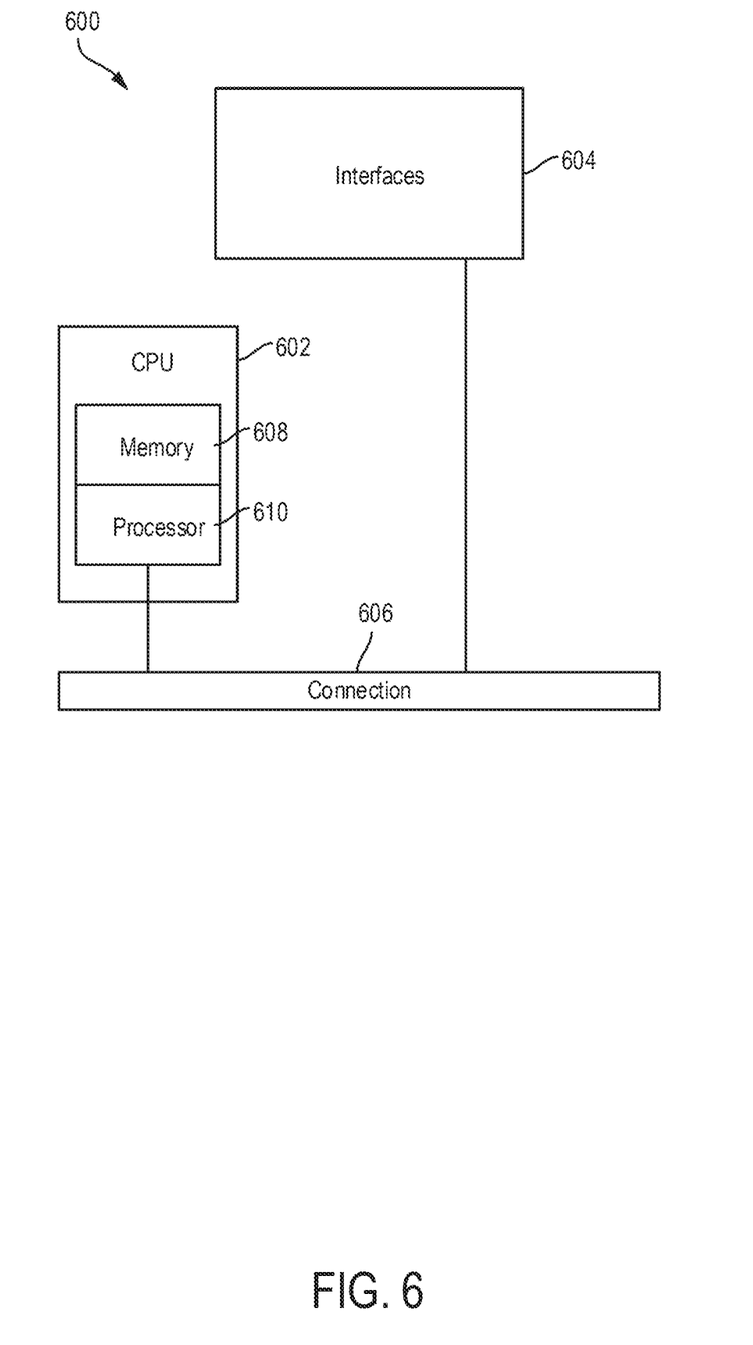
FIG. 6 illustrates an example of a network device, according to some aspects of the present disclosure.

FIG. 6 illustrates an example of a network device, according to some aspects of the present disclosure. Network device 600 can be a network appliance implementing the functionalities of industrial devices 402, 404, 406, 408, edge devices 410, 412, 414, security service 416, among other components described above with reference to FIGS. 1-4. The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7:
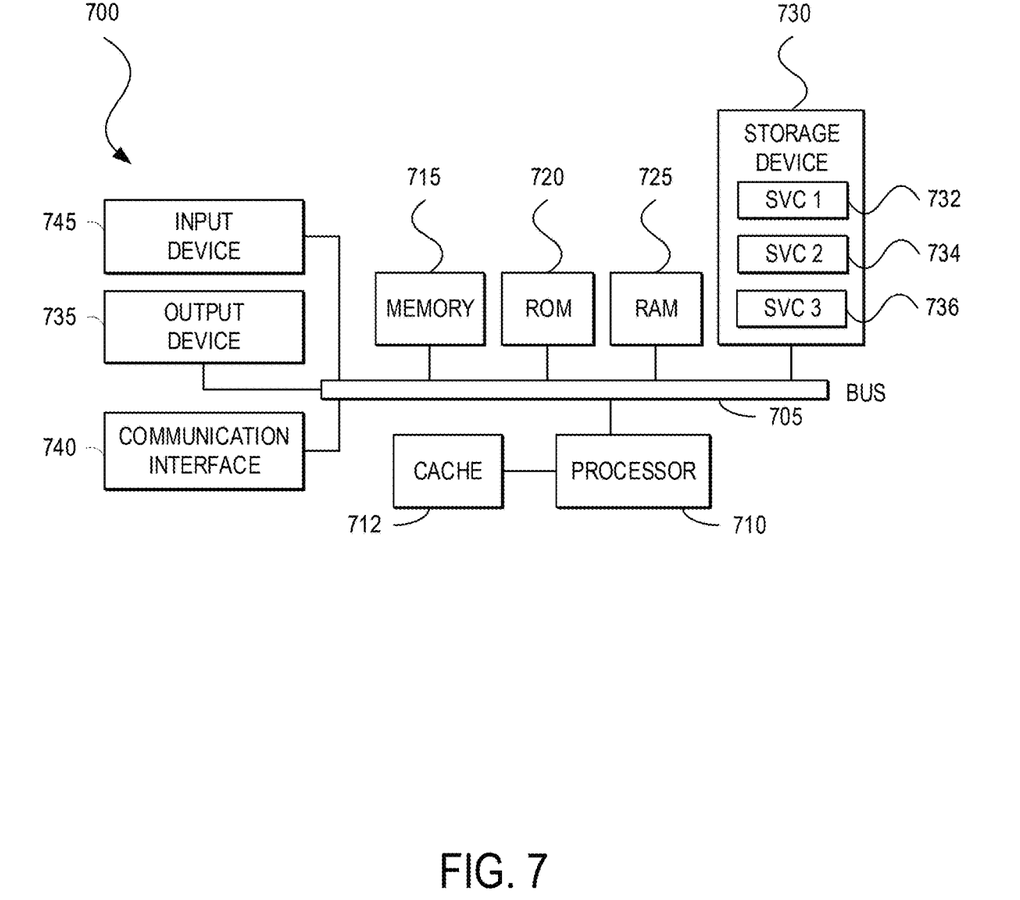
FIG. 7 illustrates an example of a bus computing system, according to some aspects of the present disclosure.

FIG. 7 illustrates an example of a bus computing system, according to some aspects of the present disclosure. Computing system 700 can be utilized as part of any one of the network components described above with reference to FIGS. 1-4, including industrial devices 402, 404, 406, 408, edge devices 410, 412, 414, security service 416, among other components described above with reference to FIGS. 1-4. Components of the computing system 700 are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module (services), such as services SVC 1 732, SVC 2 734, and SVC 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software SVCs 732, 734, and 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   determining, by a network controller, a corresponding level of a security model associated with each device of a plurality of devices connected to a network, each level of the security model having a corresponding tag;
   applying, by the network controller and to each of the plurality of devices, the corresponding tag based on the corresponding level of the security model with which each of the plurality of devices are associated;
   receiving, at the network controller and over a network connection, network traffic from at least one of the plurality of devices and the corresponding tag;
   analyzing the corresponding tag associated with the network traffic;
   determining a destination for the network traffic;
   applying one or more security measures to the network traffic based on the corresponding tag for the at least one device and a corresponding tag of the destination for the network traffic;
   upon applying the one or more security measures to the network traffic, changing the corresponding tag with which the network traffic is associated to the corresponding tag of the destination to yield a modified tag; and
   sending the network traffic to the destination with the modified tag, the modified tag being the corresponding tag of the destination after the one or more security measures are applied to the network traffic.

2. The method of claim 1, wherein applying the one or more security measures to the network traffic comprises:
   comparing the corresponding tag of the at least one device with the corresponding tag of the destination; and
   passing the network traffic through a firewall for a level of the security model associated with the corresponding tag of the destination.

3. The method of claim 1, wherein the network connection is a private virtual network connection.

4. The method of claim 1, wherein the security model is a virtualized Purdue model.

5. The method of claim 4, wherein the virtualized Purdue model is offered as a cloud-based service to an entity operating the plurality of devices.

6. The method of claim 1, wherein the plurality of devices include Internet of Things.

7. The method of claim 1, wherein the corresponding tag associated with the corresponding level of the security model is applied to the at least one device at an edge device to which the at least one device is connected.

8. A network controller comprising:
   one or more memories having computer-readable instructions stored therein; and
   one or more processors configured to execute the computer-readable instructions to:
   determine a corresponding level of a security model associated with each device of a plurality of devices connected to a network, each level of the security model having a corresponding tag;
   apply, to each of the plurality of devices, the corresponding tag based on the corresponding level of the security model with which each of the plurality of devices are associated;
   receive, over a network connection, network traffic from at least one of the plurality of devices and the corresponding tag;
   analyze the corresponding tag associated with the network traffic;
   determine a destination for the network traffic;
   apply one or more security measures to the network traffic based on the corresponding tag for the at least one device and a corresponding tag of the destination for the network traffic;
   upon applying the one or more security measures to the network traffic, change the corresponding tag with which the network traffic is associated to the corresponding tag of the destination to yield a modified tag; and send the network traffic to the destination with the modified tag, the modified tag being the corresponding tag of the destination after the one or more security measures are applied to the network traffic.

9. The network controller of claim 8, wherein the one or more processors are configured to apply the one or more security measures to the network traffic by:
comparing the corresponding tag of the at least one device with the corresponding tag of the destination; and
passing the network traffic through a firewall for a level of the security model associated with the corresponding tag of the destination.

10. The network controller of claim 8, wherein the network connection is a private virtual network connection.

11. The network controller of claim 8, wherein the security model is a virtualized Purdue model.

12. The network controller of claim 11, wherein the virtualized Purdue model is offered as a cloud-based service to an entity operating the plurality of devices.

13. The network controller of claim 8, wherein the plurality of devices include Internet of Things.

14. The network controller of claim 8, wherein the corresponding tag associated with the corresponding level of the security model is applied to the at least one device at an edge device to which the at least one device is connected.

15. One or more non-transitory computer-readable media comprising computer-readable instructions, which when executed by one or more processors of a network controller, cause the network controller to:
determine a corresponding level of a security model associated with each device of a plurality of devices connected to a network, each level of the security model having a corresponding tag;
apply, to each of the plurality of devices, the corresponding tag based on the corresponding level of the security model with which each of the plurality of devices are associated;
receive, over a network connection, network traffic from at least one of the plurality of devices and the corresponding tag;
analyze the corresponding tag associated with the network traffic;
determine a destination for the network traffic;
apply one or more security measures to the network traffic based on the corresponding tag for the at least one device and a corresponding tag of the destination for the network traffic;
upon applying the one or more security measures to the network traffic, change the corresponding tag with which the network traffic is associated to the corresponding tag of the destination to yield a modified tag; and
send the network traffic to the destination with the modified tag, the modified tag being the corresponding tag of the destination after the one or more security measures are applied to the network traffic.

16. The one or more non-transitory computer-readable media of claim 15, wherein the execution of the computer-readable instructions cause the network controller to apply the one or more security measures to the network traffic by:
comparing the corresponding tag of the at least one device with the corresponding tag of the destination; and
passing the network traffic through a firewall for a level of the security model associated with the corresponding tag of the destination.

17. The one or more non-transitory computer-readable media of claim 15, wherein the network connection is a private virtual network connection.

18. The one or more non-transitory computer-readable media of claim 15, wherein the security model is a virtualized Purdue model.

19. The one or more non-transitory computer-readable media of claim 18, wherein the virtualized Purdue model is offered as a cloud-based service to an entity operating the plurality of devices.

20. The one or more non-transitory computer-readable media of claim 15, wherein the corresponding tag associated with the corresponding level of the security model is applied to the at least one device at an edge device to which the at least one device is connected.

* * * * *